United States Patent
Xie

(10) Patent No.: US 9,001,763 B2
(45) Date of Patent: Apr. 7, 2015

(54) WIRELESS SERVICE ACCESS METHOD AND APPARATUS

(71) Applicant: Huawei Technologies Co., Ltd., Shenzhen, Guangdong (CN)

(72) Inventor: Yan Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 13/715,689

(22) Filed: Dec. 14, 2012

(65) Prior Publication Data

US 2013/0176958 A1 Jul. 11, 2013

(30) Foreign Application Priority Data

Dec. 21, 2011 (CN) .......................... 2011 1 0433218

(51) Int. Cl.
*H04W 72/10* (2009.01)
*H04W 72/12* (2009.01)

(52) U.S. Cl.
CPC ............ *H04W 72/10* (2013.01); *H04W 72/121* (2013.01); *H04W 72/1247* (2013.01)

(58) Field of Classification Search
CPC ... H04W 72/04; H04W 72/10; H04W 72/121; H04W 72/1247; H04L 12/4625; H04L 12/66; H04L 12/2854; H04L 69/40
USPC ................. 370/235, 315, 329, 401, 412, 428; 709/201, 203, 218, 226, 229
See application file for complete search history.

(56) References Cited

U.S. PATENT DOCUMENTS

| | | | |
|---|---|---|---|
| 5,995,511 A * | 11/1999 | Zhou et al. | 370/412 |
| 7,321,926 B1 * | 1/2008 | Zhang et al. | 709/220 |
| 8,560,693 B1 * | 10/2013 | Wang et al. | 709/226 |
| 2005/0025167 A1 * | 2/2005 | Ishibashi et al. | 370/412 |
| 2005/0053046 A1 | 3/2005 | Wang | |

(Continued)

FOREIGN PATENT DOCUMENTS

| CN | 1808992 A | 7/2006 |
|---|---|---|
| JP | 2003110575 A | 4/2003 |

(Continued)

OTHER PUBLICATIONS

Extended European Search Report in corresponding European Patent Application No. 12195584.3 (Mar. 18, 2013).

(Continued)

*Primary Examiner* — Afsar M Qureshi
(74) *Attorney, Agent, or Firm* — Leydig, Voit & Mayer, Ltd.

(57) ABSTRACT

Embodiments of the present invention disclose a wireless service access method and apparatus. In the method, a group policy of a wireless access point AP and a group priority of a virtual access point VAP are configured, an access priority of a service access request of a user is determined according to the group policy of the AP and the group priority of the VAP, and a service access operation is executed according to the access priority. In the embodiments of the present invention, a differential QoS guarantee based on a user priority is provided, and QOS of a high priority user and a high priority service in a situation that wireless resources are constrained or environment is severe can be ensured.

9 Claims, 2 Drawing Sheets

(56) References Cited

U.S. PATENT DOCUMENTS

| | | | |
|---|---|---|---|
| 2006/0046730 A1* | 3/2006 | Briancon et al. | 455/446 |
| 2006/0165103 A1* | 7/2006 | Trudeau et al. | 370/401 |
| 2007/0041385 A1 | 2/2007 | Sali et al. | |
| 2008/0175263 A1 | 7/2008 | Chen et al. | |
| 2008/0183800 A1* | 7/2008 | Herzog et al. | 709/202 |
| 2011/0235513 A1 | 9/2011 | Ali | |
| 2011/0276817 A1* | 11/2011 | Fullerton et al. | 713/324 |

FOREIGN PATENT DOCUMENTS

| | | |
|---|---|---|
| JP | 2005124166 A | 5/2005 |
| JP | 2006211362 A | 8/2006 |
| JP | 2006237855 A | 9/2006 |
| JP | 2007181002 A | 7/2007 |
| JP | 2007518359 A | 7/2007 |
| JP | 2007266942 A | 10/2007 |
| JP | 2009505587 A | 2/2009 |
| KR | 20090114410 A | 11/2009 |
| WO | WO 2007075814 A2 | 7/2007 |
| WO | 2010125457 A1 | 11/2010 |

OTHER PUBLICATIONS

"IEEE Standard for Information Technology—Telecommunications and Information Exchange between Systems—Local and Metropolitan Area Networks—Specific Requirements; Park 11: Wireless LAN Medium Access Control (MAC) and Physical Layer (PHY) Specifications; Amendment 8: Medium Access Control (MAC) Quality of Service Enhancements," Nov. 11, 2005, IEEE, New York, New York.

Thangaraj et al., "Performance Analysis of the IEEE 802.11e Wireless Networks with TCP ACK Prioritization," Feb. 18, 2010, Springer Science and Business Media LLC, Berlin, Germany.

Passas et al., "Prioritized Support of Different Traffic Classes in IEEE 802.11e Wireless LANs," 2006, Elsevier B.V., Netherlands, Amsterdam.

"802.11e—IEEE Standard for Information technology—Telecommunications and Information Exchange Between Systems—Local and Metropolitan Area Networks—Specific Requirements; Part 11: Wireless LAN Medium Access Control (MAC) and Physical Layer (PHY) Specifications Amendment 8: Medium Access Control (MAC) Quality of Service Enhancements," Nov. 11, 2005, IEEE, New York, New York.

* cited by examiner

WIRELESS SERVICE ACCESS METHOD AND APPARATUS

CROSS-REFERENCE TO RELATED APPLICATION

This application claims priority to Chinese Patent Application No. 201110433218.2, filed on Dec. 21, 2011, which is hereby incorporated by reference in its entirety.

FIELD OF THE INVENTION

The present invention relates to communication networks, and in particular, to a wireless service access method and apparatus.

BACKGROUND

As a manner of accessing a network by a user, a wireless local area network (WLAN) has advantages such as simple wiring and convenience for moving. Moreover, with the evolution of technologies, the bandwidth of the wireless local area network is increased day by day. However, in the aspect of QOS (Quality of Service, quality of service), currently, only EDCA (Enhanced Distributed Channel Access, enhanced distributed channel access) QoS in IEEE802.11e can satisfy data service transmission, but is obviously inadequate in a full-services (data, voice, video, and the like) situation.

The EDCA QOS has the following limitations: first, user priorities cannot be distinguished, and a service cannot be preferentially provided for a high priority user according to a user priority, so as to ensure quality of service of the high priority user; secondly, because a priority in the EDCA QOS is a relative priority, a high priority service is affected in a situation of severe environment, and QOS of the high priority service cannot be completely ensured.

SUMMARY

In order to solve the foregoing problem, an embodiment of the present invention provides a wireless service access method, where the method includes:

receiving a service access request of a user; and determining an access priority of the service access request according to a group policy of an access point AP for receiving the service access request and a group priority of a virtual access point VAP that the user belongs to, and executing a service access operation according to the access priority.

Correspondingly, an embodiment of the present invention further provides a wireless service access apparatus, where the apparatus includes:

a receiving module, configured to receive a service access request of a user; and a service access module, configured to determine an access priority of the service access request according to a group policy of an access point AP for receiving the service access request and a group priority of a virtual access point VAP that the user belongs to, and execute a service access operation according to the access priority.

An embodiment of the present invention further provides an access method of a wireless access point AP, where the method includes:

receiving a packet sent by a user; obtaining a priority corresponding to the packet; sending the packet into a corresponding priority queue; and sending packets in different priority queues according to a group policy of the AP.

Correspondingly, an embodiment of the present invention further provides a wireless access point AP, where the AP includes:

a receiving unit, configured to receive a packet sent by a user; a priority obtaining unit, configured to obtain a priority corresponding to the packet; a packet allocation unit, configured to send the packet into a corresponding priority queue; and a packet sending unit, configured to send packets in different priority queues according to a group policy of the AP.

The embodiments of the invention have the following beneficial effects: by adopting a group policy and a group priority, a service can be preferentially provided for a high priority user according to a user priority, thereby providing a differential QoS guarantee based on the user priority, and ensuring QOS of the high priority user and a high priority service in a situation that wireless resources are constrained or environment is severe.

BRIEF DESCRIPTION OF THE DRAWINGS

To illustrate technical solutions in embodiments of the present invention or in the prior art more clearly, accompanying drawings required for describing the embodiments or the prior art are introduced briefly in the following. Apparently, the accompanying drawings in the following description merely show some embodiments of the present invention, and persons of ordinary skill in the art can derive other drawings from these drawings without creative efforts.

DETAILED DESCRIPTION OF THE EMBODIMENTS

Technical solutions in embodiments of the present invention are described clearly and completely in the following with reference to accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

Figure 1:
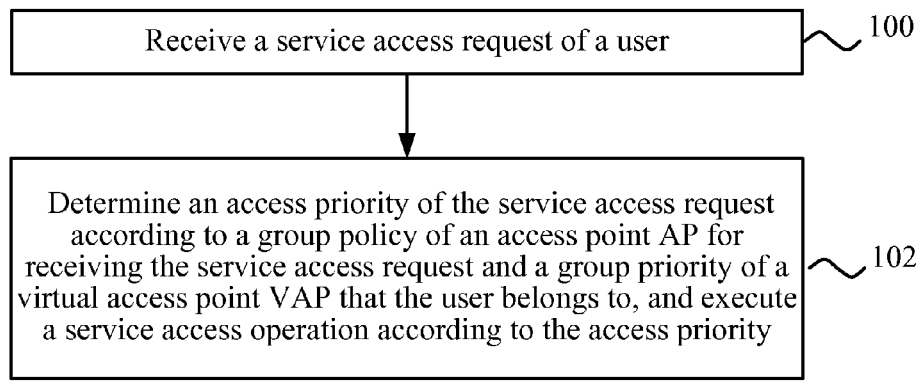
FIG. 1 is a schematic flow chart of a wireless service access method according to an embodiment of the present invention.

Referring to FIG. 1, an embodiment of the present invention provides a wireless service access method, where the method includes:

100: Receive a service access request of a user.

102: Determine an access priority of the service access request according to a group policy of an access point AP receiving the service access request and a group priority of a virtual access point VAP that the user belongs to, and execute a service access operation according to the access priority.

For example, the group policy of the AP may be any one of group-only (group-only scheduling policy), group-wrr (group balance scheduling policy), Service-first (service-first scheduling policy) and group-first (group-first scheduling policy). group-only refers to priority scheduling according to a group, and user services in a same group are scheduled in an FIFO (first-in-first-out) manner. group-wrr refers to priority scheduling according to a sending weight allocated to each group; for example, if a balance coefficient of a group group 1 is 0.8 and a balance coefficient of a group group 2 is 0.2, the group group 1 will occupy 80% air interface wireless resources of the AP and the group group 2 will occupy 20% air interface wireless resources of the AP, and service access requests in different groups of a same priority are scheduled in the FIFO manner. Service-first refers to scheduling where not only a service priority needs to be judged but also a same service is scheduled according to a group priority. group-first refers to that all data of a user in a high priority group enjoys a high priority, that is, user data in a low priority group can be sent or received only after data of the high priority user in the high priority group is completely sent or received, and users in groups of a same priority receive services in a round-robin (round-robin) manner, and services of a same user are scheduled according to a priority of a service type. The group policy of the AP may be pre-configured in the AP.

In this embodiment, multiple virtual APs are configured on a single physical AP, and the virtual APs may be implemented by creating multiple virtual interfaces on the AP. Each user may be associated with one VAP. In this way, one physical wireless local area network WLAN can be virtualized into multiple WLANs. In this embodiment, for example, it may be defined that group priorities are divided into eight priorities 0 to 7, where priority 0 is the highest priority and priority 7 is the lowest priority, and definitely, a priority may also be randomly configured according to requirements, which is not described in detail here. In this embodiment, each VAP joins one group and has a group priority of the group.

For example, the AP obtains a pre-configured group priority of the VAP that the user belongs to, and provides a corresponding access operation for the user according to the pre-configured group policy. For example, when the group policy is group-only, it is assumed that group priorities of VAP 1 and VAP 2 are 0 and group priorities of VAPs 3 to 8 are 1. Then, priorities of service access requests of all users from VAP 1 and VAP 2 are higher than priorities of service access requests from VAPs 3 to 8. The service access requests from VAP 1 and VAP 2 have the same priority, where a service access request arriving first is served first without considering a service type of the service access request. When the group policy is group-wrr, the group policy further carries a balance coefficient of each group, that group priorities of VAP 1 and VAP 2 are 0 and group priorities of VAPs 3 to 8 are 1 is still taken as an example, for example, a balance coefficient of a group with a group priority of 0 is 0.8 and a balance coefficient of a group with a group priority of 1 is 0.2, then VAP 1 and VAP 2 will obtain 80% air interface wireless resources of the entire AP and VAPs 3 to 8 will obtain 20% air interface wireless resources of the entire AP, and service access requests of VAPs of groups of a same group priority are processed in a first-come-first-served manner. When the group policy is Service-first, that group priorities of VAP 1 and VAP 2 are 0 and group priorities of VAPs 3 to 8 are 1 is still taken as an example, first a service type of the service access request of the user is judged, for example, by adopting the prior art, service types are divided into four types: voice, video, best-effort and background, and then for a same service type, a service access request from a high priority group is preferentially served according to the group priority. When the group policy is group-first, that group priorities of VAP 1 and VAP 2 are 0 and group priorities of VAPs 3 to 8 are 1 is still taken as an example, service access requests of users that belong to VAP 1 and VAP 2 are served preferentially, only when non of the users that belong to VAP 1 and VAP 2 uses wireless resources of the AP, users of VAPs 3 to 8 can obtain services, thereby ensuring a high priority user preferentially obtains a service, and in a group-first scenario, when the wireless resources of the AP cannot satisfy a service access requirement from a high priority group, a service of a low priority group currently using the wireless resources of the AP can be discarded, so as to release enough wireless resources, so that the access request of the high priority group is preferentially satisfied.

The wireless access method provided by the embodiment of the invention may be, for example, applied in the wireless access point AP.

Figure 2:
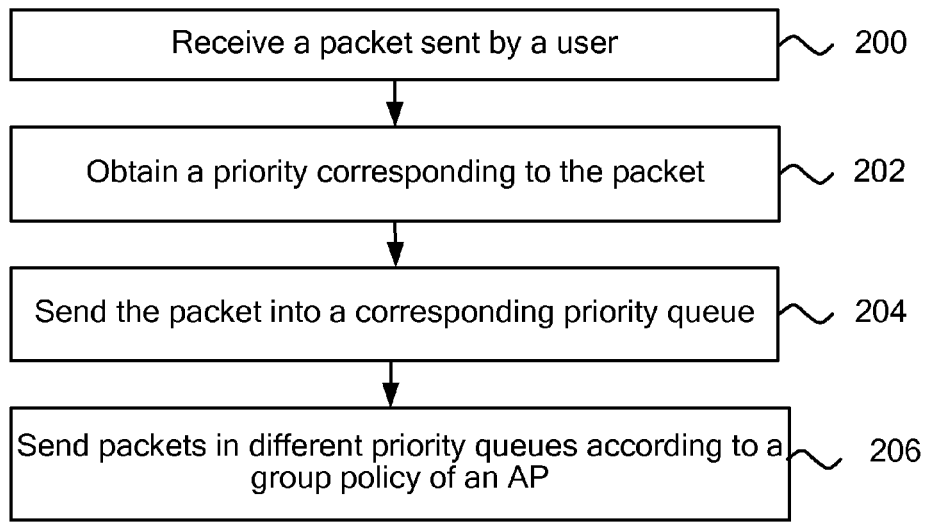
FIG. 2 is a schematic diagram of an access method of a wireless access point AP according to an embodiment of the present invention.

Referring to FIG. 2, an embodiment of the present invention further provides an access method of a wireless access point AP, where the method includes:

200: Receive a packet sent by a user.

202: Obtain a priority corresponding to the packet.

Specifically, because the user sending the packet belongs to a certain VAP, and the VAP joins a certain group, a priority of the group that the VAP joins is the priority corresponding to the packet.

Further, step 202 may further include a step of obtaining a service type corresponding to the packet, so as to satisfy a requirement of a group policy in a scenario where service scheduling according to the service type is involved.

204: Send the packet into a corresponding priority queue.

In this embodiment, the corresponding priority queue may be configured according to the number of groups set in the AP. For example, a total of eight groups 0 to 7 are set in the AP, then eight priority queues are configured correspondingly, and each priority queue corresponds to one group and has a group priority of the corresponding group.

206: Send packets in different priority queues according to a group policy of the AP.

Specifically, the packets in different priority queues are scheduled according to the configured group policy of the AP. For example, when the group policy is group-first, group priorities of VAP 1 and VAP 2 are 0 and group priorities of VAPs 3 to 8 are 1. Then, packets of users from VAP 1 and VAP 2 are sent to a queue with a priority of 0, and packets of users from VAPs 3 to 8 are sent to a queue with a priority of 1. Because the priority of the queue with the priority of 0 is higher than that of the queue with the priority of 1, a packet in the queue with the priority of 0 is sent preferentially, and only when no packet exists in the queue with the priority of 0, a packet in the queue with the priority of 1 is sent. Further, according to the group policy, when a packet in a high priority queue needs to be sent, but current available wireless resources of the AP cannot satisfy a requirement of sending the packet, wireless resources occupied by a low priority queue can be released, thereby providing enough AP wireless resources for the high priority queue.

Further, in step 206, the packets in different priority queues may be processed according to the group policy of the AP and service types of the packets. Specifically, priority queues corresponding to different groups may be further divided into priority sub-queues corresponding to different service types. For example, the service types may be divided into four types: voice, video, best-effort, and background. Accordingly, a priority queue may be further divided into four sub-queues: a voice sub-queue, a video sub-queue, a best-effort sub-queue, and a background sub-queue. Priorities of different sub-queues may be configured according to a requirement of the user. For example, priorities of the voice sub-queue, the video sub-queue, the best-effort sub-queue, and the background sub-queue are set in descending order. In this way, in a certain priority queue, a packet in a high priority sub-queue is sent prior to a packet in a low priority sub-queue. For another example, a priority queue may also be set for each service type according to the group policy. For example, priority queues with priorities of 0 to 7 are set for a voice service, and similarly, priority queues with priorities of 0 to 7 are set for a video service. In this way, corresponding service scheduling may be provided when the group policy is Service-first, which is not described in detail here.

In the wireless access method and the access method of the wireless access point AP which are provided by the embodiments of the invention, by using a group policy and a group priority, a service can be preferentially provided for a high priority user according to a user priority, thereby providing a differential QoS guarantee based on the user priority, and ensuring QOS of the high priority user and a high priority service in a situation that wireless resources are constrained or environment is severe.

Figure 3:
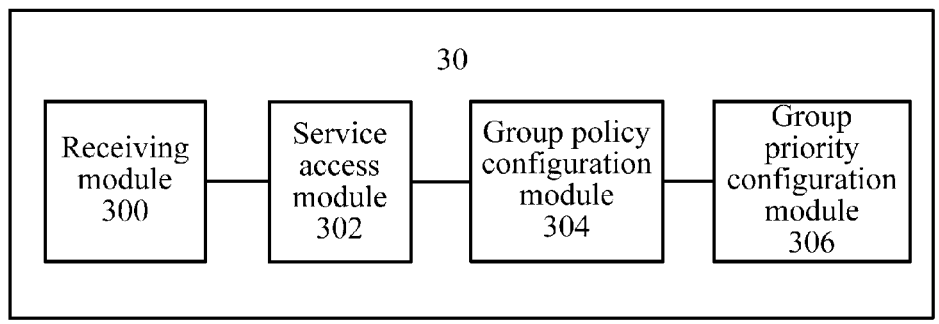
FIG. 3 is a schematic structural diagram of a wireless service access apparatus according to an embodiment of the present invention.

Referring to FIG. 3, an embodiment of the present invention provides a wireless service access apparatus 30, where the wireless service access apparatus 30 may include:

a receiving module 300, configured to receive a service access request of a user; and a service access module 302, configured to determine an access priority of the service access request according to a group policy of an access point AP receiving the service access request and a group priority of a virtual access point VAP that the user belongs to, and execute a service access operation according to the access priority.

The wireless service access apparatus 30 may further include: a group policy configuration module 304, configured to configure a group policy of a wireless access point AP.

Specifically, the group policy configuration module 304 is configured to configure the group policy of the wireless access point AP to any one of the following group policies: a group only scheduling policy group-only, a group balance scheduling policy group-wrr, a service-first scheduling policy Service-first or a group-first scheduling policy group-first.

The wireless service access apparatus 30 may further include: a group priority configuration module 306, configured to configure a group priority of a virtual access point VAP.

The wireless service access apparatus in the embodiment of the present invention may be specifically configured to execute the method of the method embodiment shown in FIG. 1, and their implementation principles and technical effects are similar, and are not described in detail here.

Figure 4:
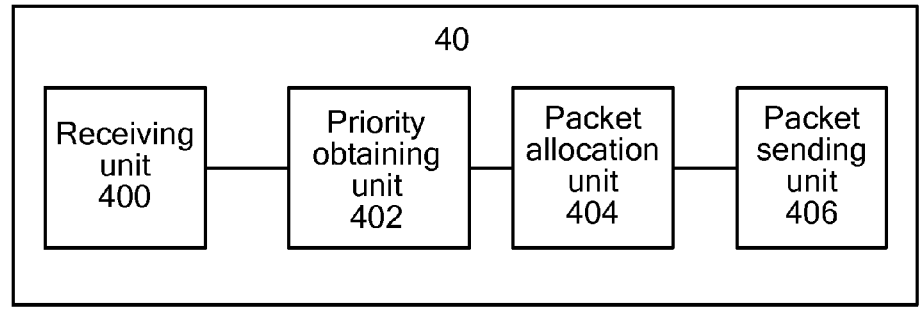
FIG. 4 is a schematic structural diagram of a wireless access point AP according to an embodiment of the present invention.

Referring to FIG. 4, an embodiment of the present invention provides a wireless access point AP 40, where the AP 40 may include:

a receiving unit 400, configured to receive a packet sent by a user;

a priority obtaining unit 402, configured to obtain a priority corresponding to the packet;

a packet allocation unit 404, configured to send the packet into a corresponding priority queue; and a packet sending unit 406, configured to send packets in different priority queues according to a group policy of the AP.

Specifically, the packet sending unit 406 includes:

a group policy obtaining subunit, configured to obtain the group policy of the AP; and a scheduling subunit, configured to perform a scheduling operation on the packets in the different priority queues according to the group policy of the AP obtained by the group policy obtaining subunit, so as to control the packets in the different priority queues to be sent according to the group policy of the AP.

The AP of the embodiment of the present invention may be specifically configured to execute the method of the method embodiment shown in FIG. 2, and their implementation principles and technical effects are similar, and are not described in detail here.

With the wireless access apparatus and the wireless access point AP which are provided by the embodiments of the invention, by using a group policy and a group priority, a service can be preferentially provided for a high priority user according to a user priority, thereby providing a differential QoS guarantee based on the user priority, and ensuring QOS of the high priority user and a high priority service in a situation that wireless resources are constrained or environment is severe.

Persons of ordinary skill in the art can understand that all or part of the procedures of the method in the foregoing embodiments may be completed by a computer program instructing relevant hardware. The program may be stored in a computer readable storage medium. When the program is run, the procedures of the method in the foregoing embodiments are performed. The storage medium may be a magnetic disk, an optical disk, a read-only memory (Read-Only Memory, ROM), a random access memory (Read-Only Memory, RAM), or the like.

What are disclosed above are only exemplary embodiments of the present invention, and definitely, the scope of the present invention is not limited thereto. Therefore, Equivalent variations made according to the claims of the present invention are still covered by the scope of the present invention.

What is claimed is:

1. A wireless service access method, comprising:

receiving a service access request of a user, wherein the user belongs to a virtual access point (VAP), the VAP joins a group, and the group comprises multiple VAPs; and determining an access priority of the service access request according to a group policy of an access point (AP) for receiving the service access request and a group priority of the VAP that the user belongs to, and executing a service access operation according to the access priority, wherein the group priority of the VAP is a group priority of the group that the VAP joins; the group policy of the AP is any one of the following: a group only scheduling policy (group-only), a group balance scheduling policy (group-wrr), a service-first scheduling policy (Service-first), and a group-first scheduling policy (group-first); wherein, the group-only refers to priority scheduling according to a group, and user services in a same group are scheduled in an FIFO (first-in-first-out) manner;

the group-wrr refers to priority scheduling according to a sending weight allocated to each group, and the group policy further carries a balance coefficient of each group, VAPs of each group obtain air interface wireless resources of the AP according to the balance coefficient of the each group, and service access requests in different groups of a same priority are scheduled in the FIFO manner;

the Service-first refers to scheduling where not only a service priority needs to be judged but also a same service is scheduled according to a group priority;

the group-first refers to that all data of a user in a high priority group enjoys a high priority, that is, user data in a low priority group can be sent or received only after data of the high priority user in the high priority group is completely sent or received, and users in groups of a same priority receive services in a round-robin.

2. The method according to claim 1, wherein the group policy of the AP is group-first;

the determining the access priority of the service access request and executing the service access operation according to the access priority comprises:

when wireless resources of the AP cannot satisfy the service access request of the user, and the user in a high priority group, discarding a service of a low priority group currently using the wireless resources of the AP, so as to release the wireless resources of the AP.

3. An access method of a wireless access point (AP), comprising:

receiving a packet sent by a user, wherein the user belongs to a virtual access point (VAP), the VAP joins a group, and the group comprises multiple VAPs;

obtaining a priority corresponding to the packet, wherein the priority corresponding to the packet is a priority of the group that the VAP joins;

sending the packet into a corresponding priority queue; and sending packets in different priority queues corresponding to multiple groups according to a group policy of the AP; wherein the group policy of the AP is any one of the following: a group only scheduling policy (group-only), a group balance scheduling policy (group-wrr), a service-first scheduling policy (Service-first), and a group-first scheduling policy (group-first); wherein, the group-only refers to priority scheduling according to a group and user services in a same group are scheduled in an FIFO (first-in-first-out) manner;

the group-wrr refers to priority scheduling according to a sending weight allocated to each group, and the group policy further carries a balance coefficient of each group, VAPs of each group obtain air interface wireless resources of the AP according to the balance coefficient of the each group, and service access requests in different groups of a same priority are scheduled in the FIFO manner;

the Service-first refers to scheduling where not only a service priority needs to be judged but also a same service is scheduled according to a group priority;

the group-first refers to that all data of a user in a high priority group enjoys a high priority, that is, user data in a low priority group can be sent or received only after data of the high priority user in the high priority group is completely sent or received, and users in groups of a same priority receive services in a round-robin.

4. The method according to claim 3, wherein the group policy is group-first;

the determining the access priority of the service access request and executing the service access operation according to the access priority comprises:

when wireless resources of the AP cannot satisfy the service access request of the user, and the user in a high priority group, discarding a service of a low priority group currently using the wireless resources of the AP, so as to release the wireless resources of the AP.

5. The method according to claim 3, wherein the obtaining the priority corresponding to the packet further comprises:

obtaining a service type corresponding to the packet, to satisfy a requirement of the group policy of the AP that service scheduling according to the service type is involved.

6. The method according to claim 5, wherein the priority queues further comprises priority sub-queues corresponding to different service es.

7. A wireless service access apparatus, comprising:

a receiving module, configured to receive a service access request of a user, wherein the user belongs to a virtual access point (VAP), the VAP joins a group, and the group comprises multiple VAPs;

a service access module, configured to determine an access priority of the service access request according to a group policy of an access point (AP) for receiving the service access request and a group priority of the VAP that the user belongs to, and execute a service access operation according to the access priority, wherein the group priority of the VAP is a group priority of the group that the VAP joins; and a group policy configuration module, configured to configure the group policy of the AP to any one of the following: a group only scheduling policy (group-only), a group balance scheduling policy (group-wrr), a service-first scheduling policy (Service-first), and a group-first scheduling policy (group-first): wherein, the group-only refers to priority scheduling according to a group, and user services in a same group are scheduled in an FIFO (first-in-first-out) manner;

the group-wrr refers to priority scheduling according to a sending weight allocated to each group, and the group policy further carries a balance coefficient of each group, VAPs of each group obtain air interface wireless resources of the AP according to the balance coefficient of the each group, and service access requests in different groups of a same priority are scheduled in the FIFO manner;

the Service-first refers to scheduling where not only a service priority needs to be judged but also a same service is scheduled according to a group priority;

the group-first refers to that all data of a user in a high priority group enjoys a high priority, that is, user data in a low priority group can be sent or received only after data of the high priority user in the high priority group is completely sent or received, and users in groups of a same priority receive services in a round-robin.

8. A wireless access point (AP), comprising:

a receiving unit, configured to receive a packet sent by a user, wherein the user belongs to a virtual access point (VAP), the VAP joins a group, and the group comprises multiple VAPs;

a priority obtaining unit, configured to obtain a priority corresponding to the packet, wherein the priority corresponding to the packet is a priority of the group that the VAP joins;

a packet allocation unit, configured to send the packet into a corresponding priority queue; and a packet sending unit, configured to send packets in different priority queues corresponding to multiple groups according to a group policy of the AP; wherein the group policy of the AP is any one of the following: a group only scheduling policy (group-only), a group balance scheduling policy (group-wrr), a service-first scheduling policy (Service-first), and a group-first scheduling policy (group-first); wherein, the group-only refers to priority scheduling according to a group, and user services in a same group are scheduled in an FIFO (first-in-first-out) manner;

the group-wrr refers to priority scheduling according to a sending weight allocated to each group, and the group policy further carries a balance coefficient of each group, VAPs of each group obtain air interface wireless resources of the AP according to the balance coefficient of the each group, and service access requests in different groups of a same priority are scheduled in the FIFO manner;

the Service-first refers to scheduling where not only a service priority needs to be judged but also a same service is scheduled according to a group priority;

the group-first refers to that all data of a user in a high priority group enjoys a high priority, that is, user data in a low priority group can be sent or received only after data of the high priority user in the high priority group is completely sent or received, and users in groups of a same priority receive services in a round-robin.

9. The AP according to claim 8, wherein the packet sending unit comprises:

a group policy obtaining subunit, configured to obtain the group policy of the AP; and a scheduling subunit, configured to perform a scheduling operation on the packets in the different priority queues according to the group policy of the AP obtained by the group policy obtaining subunit, so as to control the packets in the different priority queues to be sent according to the group policy of the AP.

* * * * *

UNITED STATES PATENT AND TRADEMARK OFFICE
CERTIFICATE OF CORRECTION

| | | |
|---|---|---|
| PATENT NO. | : 9,001,763 B2 | Page 1 of 1 |
| APPLICATION NO. | : 13/715689 | |
| DATED | : April 7, 2015 | |
| INVENTOR(S) | : Yan Xie | |

It is certified that error appears in the above-identified patent and that said Letters Patent is hereby corrected as shown below:

In the claims

Column 8, line 3, "service es" should read -- service types --.

Signed and Sealed this
Seventeenth Day of November, 2015

Michelle K. Lee
*Director of the United States Patent and Trademark Office*